(12) United States Patent
Wendorff et al.

(10) Patent No.: US 7,120,458 B2
(45) Date of Patent: Oct. 10, 2006

(54) DATA PHONE WITH CONVERTIBLE KEYPAD AND METHOD OF USING SAME

(75) Inventors: John J. Wendorff, San Diego, CA (US); Gad Shaanan, La Jolla, CA (US)

(73) Assignee: Kyocera Wireless Corp., San Diego, CA (US)

( * ) Notice: Subject to any disclaimer, the term of this patent is extended or adjusted under 35 U.S.C. 154(b) by 553 days.

(21) Appl. No.: 10/079,632

(22) Filed: Feb. 19, 2002

(65) Prior Publication Data

US 2003/0157957 A1    Aug. 21, 2003

(51) Int. Cl.
*H04M 1/00* (2006.01)

(52) U.S. Cl. .............. 455/550.1; 455/556.1; 455/566

(58) Field of Classification Search ........... 455/550, 455/556, 566, 575, 90, 347, 553, 575.4, 557, 455/550.1, 90.1, 556.1; 345/168, 169; 379/433.07, 379/433.04, 433.01, 433.12, 433.1, 368
See application file for complete search history.

(56) References Cited

U.S. PATENT DOCUMENTS

| | | | |
|---|---|---|---|
| 6,115,616 A * | 9/2000 | Halperin et al. ............ 455/557 |
| 6,141,540 A * | 10/2000 | Richards et al. .......... 455/575.3 |
| 6,370,018 B1 * | 4/2002 | Miller et al. ............... 361/680 |
| 6,466,202 B1 * | 10/2002 | Suso et al. .................. 345/169 |
| 6,535,605 B1 * | 3/2003 | Ghassabian .............. 379/433.1 |
| 6,580,932 B1 * | 6/2003 | Finke-Anlauff ............ 455/566 |
| 6,774,888 B1 * | 8/2004 | Genduso ..................... 345/168 |
| 6,894,626 B1 * | 5/2005 | Olodort et al. ............... 341/22 |
| 2003/0073456 A1 * | 4/2003 | Griffin et al. ............... 455/550 |
| 2003/0124992 A1 * | 7/2003 | Riddiford .................... 455/90 |
| 2004/0095328 A1 * | 5/2004 | Sirola et al. ................ 345/169 |
| 2004/0169642 A1 * | 9/2004 | Olodort et al. ............ 345/168 |
| 2005/0017953 A1 * | 1/2005 | Pekka ........................ 345/169 |

* cited by examiner

*Primary Examiner*—Matthew Anderson
*Assistant Examiner*—Tan Trinh

(57) ABSTRACT

A data phone includes a data phone housing and a convertible keypad carried by the housing. The convertible keypad is adapted to convert between a telephone keypad and a keyboard. The telephone keypad has a first number of input keys available for selection by a user to dial out a phone number and the keyboard has a second number of input keys available for selection by a user to enter data into the data phone. The second number of input keys of the keyboard is greater than the first number of input keys of the telephone keypad.

17 Claims, 7 Drawing Sheets

DATA PHONE WITH CONVERTIBLE KEYPAD AND METHOD OF USING SAME

FIELD OF THE INVENTION

The present invention is in the field of wireless, portable, data phones.

BACKGROUND OF THE INVENTION

Wireless data phones combine the technology of cellular phones and personal digital assistants ("PDA"). Not only can data phones send and receive wireless telephone calls and pages like a standard cellular phone, but they also may include extensive contact, calendar, memo, and task information, send and receive e-mails and other text messages, and run video games and numerous other software applications.

At a tremendous expense, the telecommunications industry, especially wireless carriers, have and continue to develop the infrastructure required for high-speed transmission of data using data phones and similar devices. However, consumers, especially consumers in the United States, have been reluctant to purchase data phones that utilize this expensive infrastructure. One reason consumers have been reluctant to purchase data phones is because they have been relatively bulky. A bulky phone makes the phone more difficult to carry around in a convenient location such as in a pocket of one's pants, jeans, or shorts for anytime use. Another reason consumers have been reluctant to purchase data phones is because they use a detachable stylus, which is easily lost or misplaced, and a special writing format to enter data into the phone.

SUMMARY OF THE INVENTION

An aspect of the invention involves a method of converting a data phone from a telephone mode to a data mode. The method includes providing a data phone in a telephone mode where the data phone has a telephone keypad with a first number of input keys available for selection by a user to dial out a phone number, and converting the data phone into a data mode by converting the telephone keypad into a keyboard with a second number of input keys available for selection by a user to enter data into the data phone. The second number of input keys of the keyboard is greater than the first number of input keys of the telephone keypad.

Another aspect of the invention involves a data phone with a data phone housing and a convertible keypad carried by the housing. The convertible keypad is adapted to convert between a telephone keypad and a keyboard. The telephone keypad has a first number of input keys available for selection by a user to dial out a phone number and the keyboard has a second number of input keys available for selection by a user to enter data into the data phone. The second number of input keys of the keyboard is greater than the first number of input keys of the telephone keypad.

A further aspect of the invention involves a method of converting a phone from a telephone mode to a second mode. The method includes providing a phone in a telephone mode where the phone has a convertible keypad that converts between a telephone keypad and at least a second input device, and converting the phone into at least a second mode by converting the convertible keypad from the telephone keypad to at least the second input device. In a preferred implementation, the second input device is a keyboard.

A still further aspect of the invention involves a data phone with a data phone housing and a convertible keypad carried by the data phone housing. The convertible keypad is adapted to convert between a telephone keypad having a first width and at least a second input device having a second width greater than the first width of the telephone keypad. In a preferred implementation, the second input device is a keyboard.

Further objects and advantages will be apparent to those skilled in the art after a review of the drawings and the detailed description of the preferred embodiments set forth below.

DETAILED DESCRIPTION OF PREFERRED EMBODIMENTS

Figure 1:
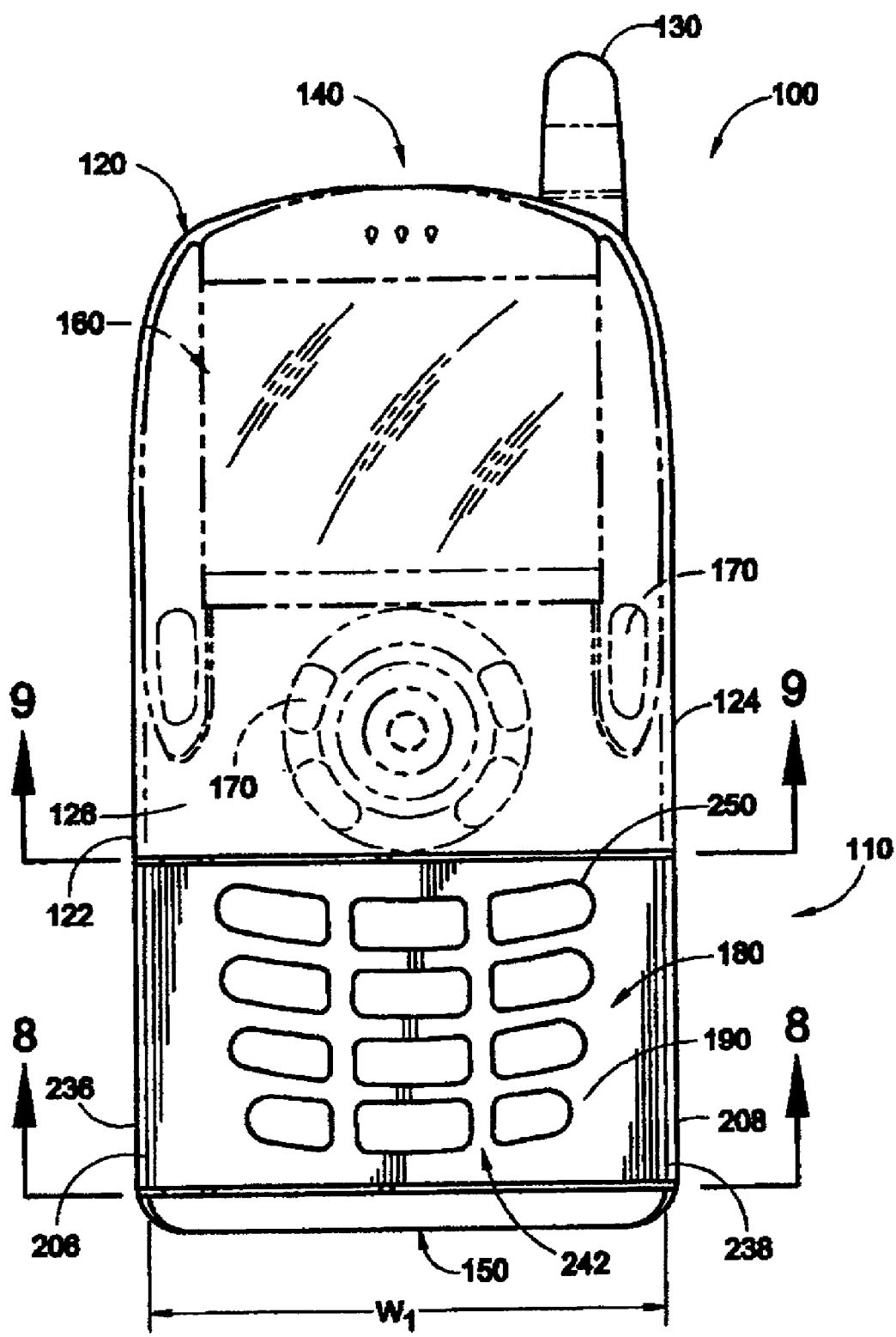
FIG. 1 is a top plan view of a data phone constructed in accordance with an embodiment of the invention with a convertible keypad shown in a home or telephone keypad position.

With reference to FIGS. 1–4, an embodiment of a data phone 100 including a convertible keypad 110 will now be described. As used herein, a "data phone" is a portable wireless phone that combines the features of a cellular phone with the features of a personal digital assistant ("PDA"). An example of such a data phone is the QCP-6035 sold by Kyocera Wireless of San Diego, Calif.

The data phone 100 includes a housing 120 with lateral edges 122, 124 and a front face 126, a retractable antenna 130 that is outwardly extendable from the housing 120, a speaker 140 disposed in and outwardly directed from the housing 120, a microphone 150 disposed in and outwardly directed from the housing 120, a display 160 outwardly directed from the housing 120, and one or more keys, buttons, or input members 170 for operating the phone 100.

Figure 2:
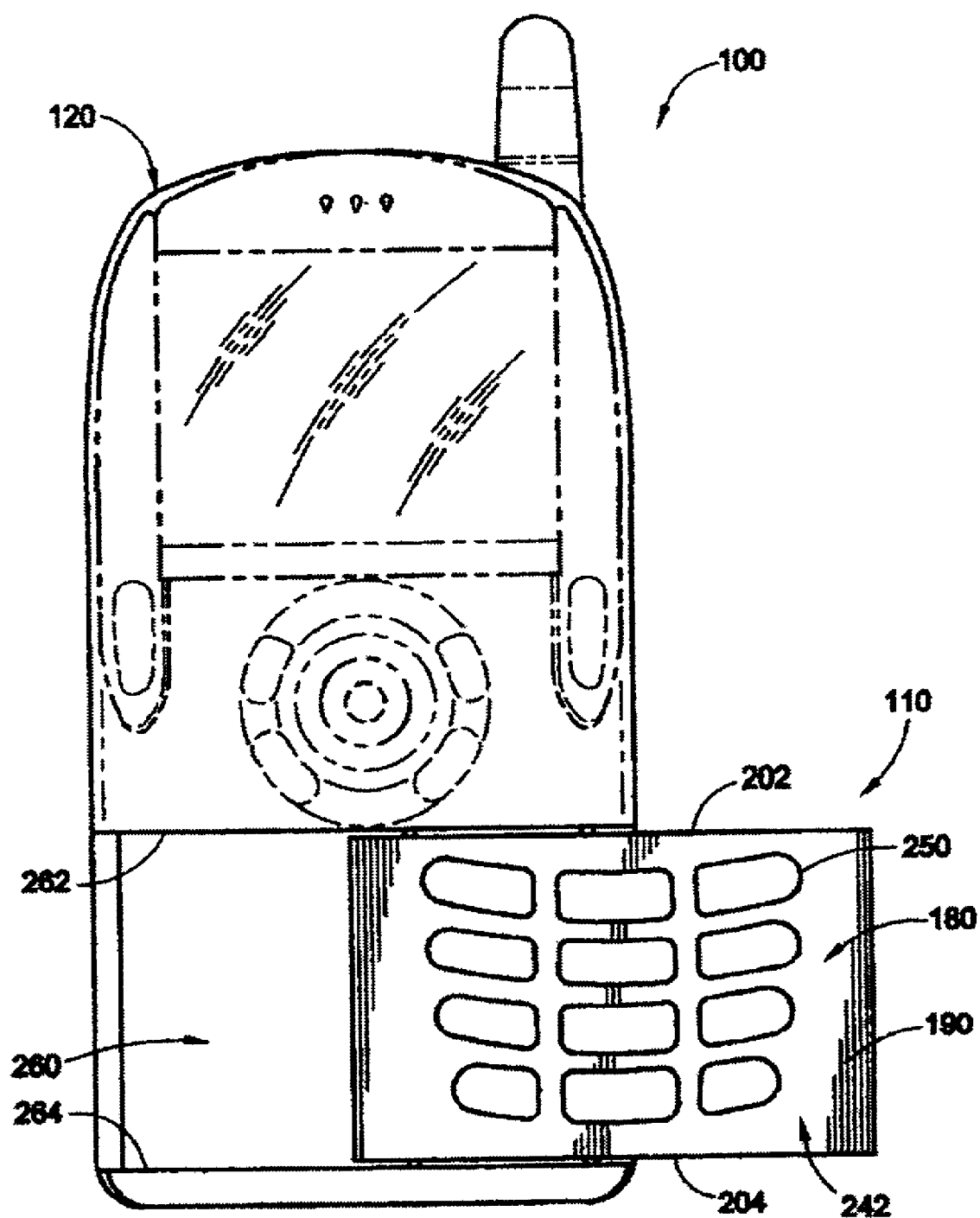
FIG. 2 is a top plan view of the data phone illustrated in FIG. 1 with the convertible keypad shown in an outward and laterally displaced position.
Figure 3:
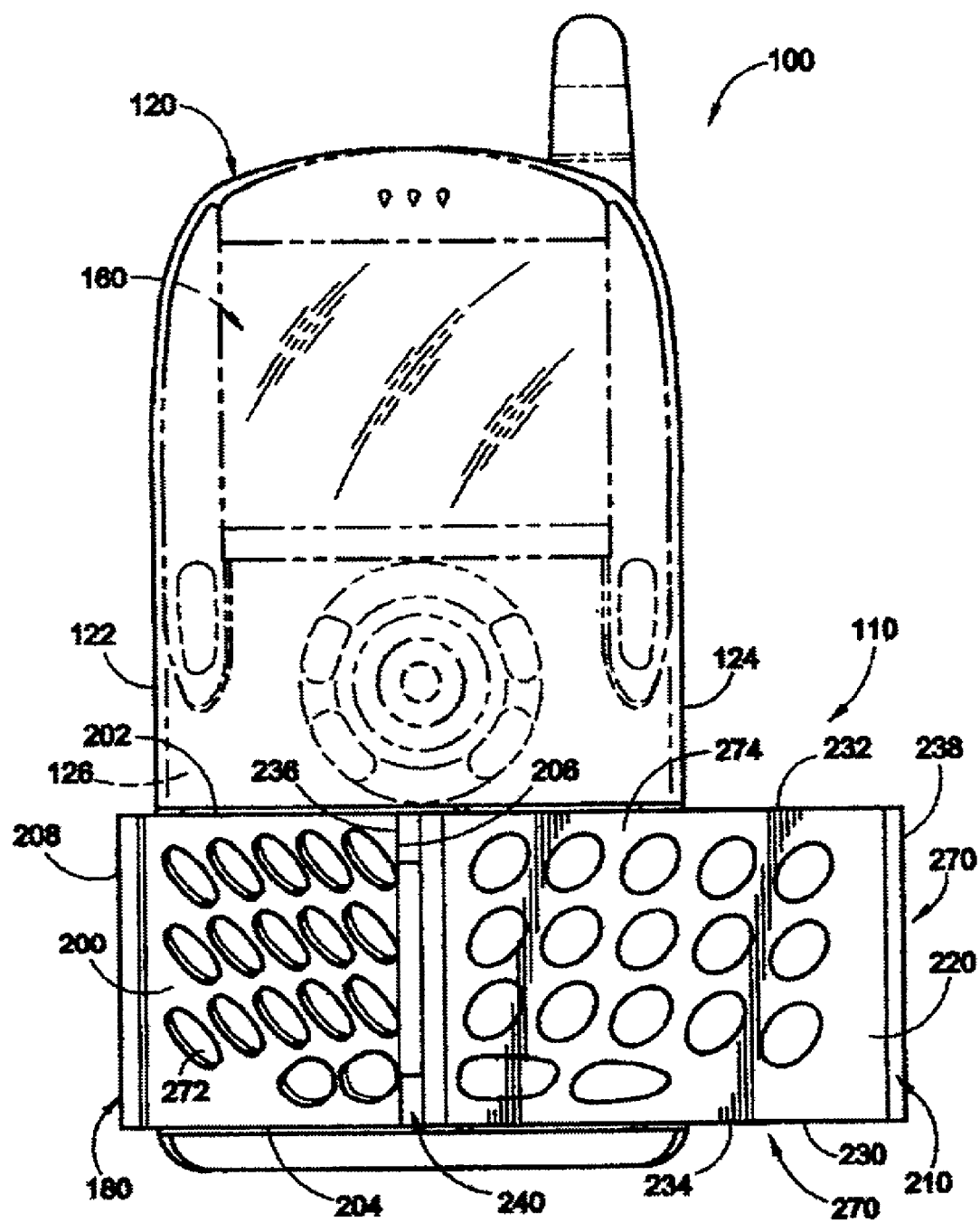
FIG. 3 is a top plan view of the data phone illustrated in FIG. 1 with the convertible keypad shown in a partially deployed keyboard position.
Figure 4:
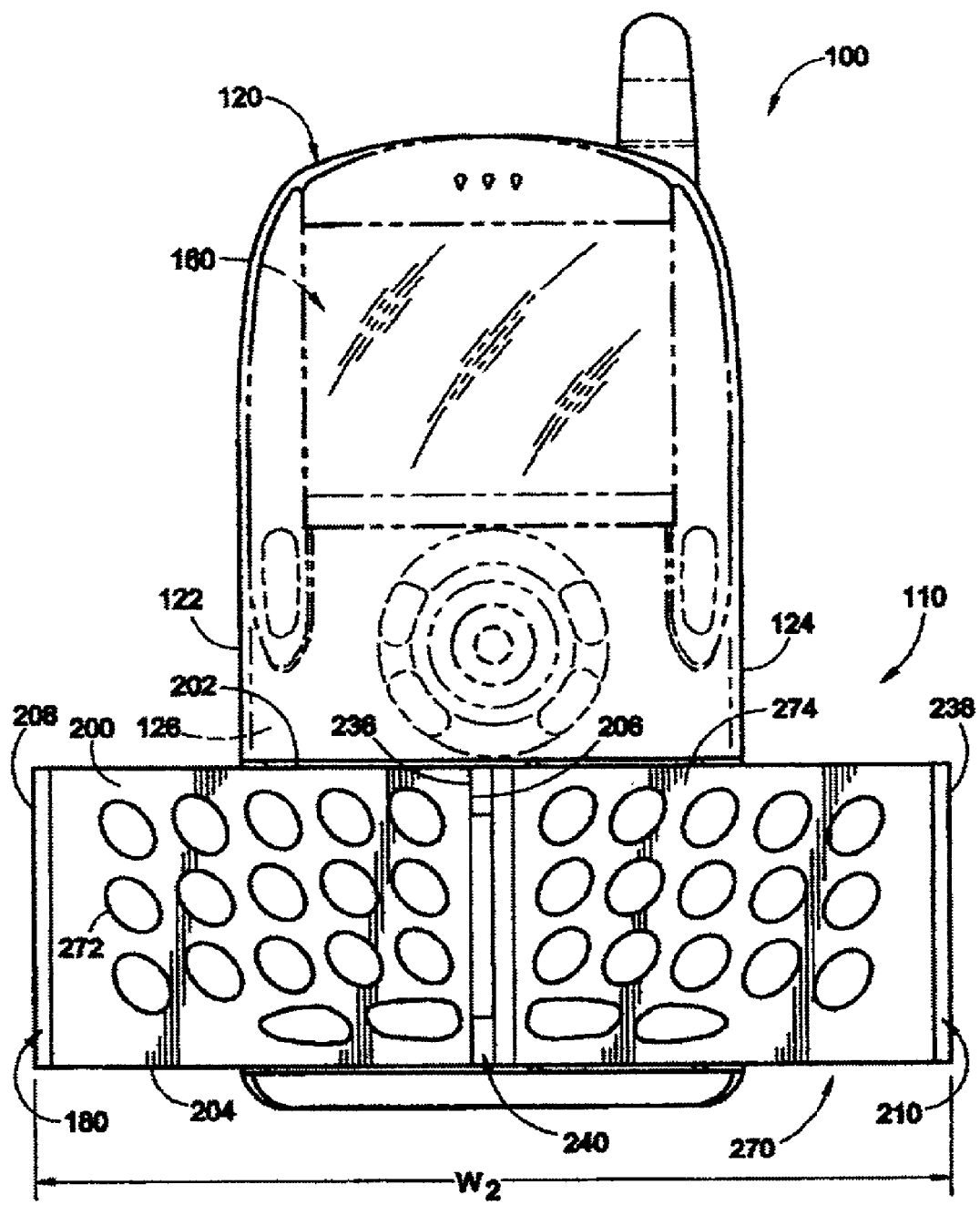
FIG. 4 is a top plan view of the data phone illustrated in FIG. 1 with the convertible keypad shown in a fully deployed keyboard position.

The convertible keypad 110 includes a first member 180 having a front 190, a back 200, an upper edge 202, a lower edge 204, a connecting edge 206, and an opposite edge 208, and a second member 210 having a front 220, a back 230, an upper edge 232, a lower edge 234, a connecting edge 236, and an opposite edge 238. The first member 180 and the second member 210 are coupled along the connecting edges 206, 236 via a hinge 240, which provides relative rotation between the members 180, 210, as shown in FIGS. 2–4. One or more springs or other biasing mechanisms may bias or urge convertible keypad 110 from the telephone keypad position shown in FIG. 1 to the keyboard position shown in FIG. 4 and/or any position in between these positions.

With reference to FIG. 1, the convertible keypad 110 is shown in the home or telephone keypad position. In this position, the convertible keypad 110 is in the form of a telephone keypad 242. The telephone keypad 242 includes a plurality of conventional telephone keys 250 (individual 0–9 number keys, * key, and # key) disposed in and outwardly directed from the front 190 of the first member 180. The phone 100 is in a telephone mode because the telephone keys 250 of the telephone keypad 242 are available for selection by a user to dial out a phone number.

Figure 8:
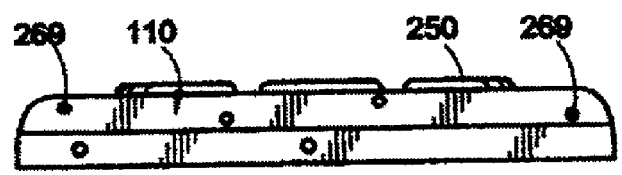
FIG. 8 is an end view, taken along lines 8—8 of FIG. 1, of the convertible keypad 110 shown in FIG. 1.
Figure 9:
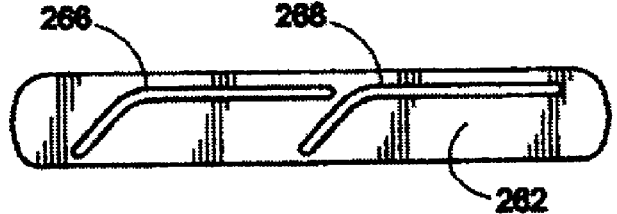
FIG. 9 is an end view, taken along lines 9—9 of FIG. 1, of grooved tracks in a recess edge of the data phone shown in FIG. 1.

In this position, the convertible keypad 110 is retained, preferably by a snap fit, within a recess 260 of the housing 120 through one or more retaining mechanisms. For example, one or more of the edges 202, 204, 232, 234 may include one or more rounded bumps that are received by one or more dimples along recess edges 262, 264 to snap fit and retain the convertible keypad 110 within the recess 260. The edges 262, 264 may include grooved tracks 266, 268 (FIG. 9) that one or more spring-loaded contacts 269 (FIG. 8) of the convertible keypad 110 may be slidably disposed within for slidable movement of the convertible keypad 110. The spring-loaded contacts 269 may electrically communicate electronics of the telephone keypad 242 and the keyboard 270 with other phone electronics within the housing 120 of the phone 100. The spring-loaded contacts 269 may also function as the retaining mechanisms to snap fit and retain the convertible keypad 110 in the telephone keypad position (FIG. 1) and/or keyboard position (FIG. 4).

With reference to FIGS. 3 and 4, when the convertible keypad 110 is flipped open into a keyboard position, the back 200 of the first member 180 and the front 220 of the second member 210 form an alphanumeric keyboard 270 including all the individual letters keys 272 of the alphabet and one or more additional keys, similar to a keyboard of a computer keyboard or typewriter. When the convertible keypad 110 is in the position shown in FIG. 4, the phone 100 is in a data mode because the keys 272 of the keyboard 270 are available for selection by a user to enter data into the data phone 100. One or more springs or other biasing mechanisms may urge the keyboard 270 from the keyboard position (FIG. 1) to the fully deployed keyboard position shown in FIG. 4. Further, the keyboard 270 may be retained within the recess 260 of the housing 120 through one or more retaining mechanisms such as the bump/dimple combination or spring-loaded contacts 269 described above.

In the data mode (and the telephone mode), one or more electrical connectors (e.g., spring-loaded contacts, flexible cables, infrared detectors/transmitters) may be used to communicate electronics of the telephone keypad 242 and the keyboard 270 with other phone electronics within the housing 120 of the phone 100.

In the data mode, the keyboard 270 is preferably centered with respect to the display 160, with the opposite edges 208, 238 extending laterally beyond the lateral edges 122, 124 of the housing 120.

The data phone 100 will now be described in use. The data phone 100 is normally in the compact, telephone mode shown in FIG. 1. In this mode, the edges 206, 236 of the convertible keypad 110 are generally aligned with and substantially flush with the left lateral edge 122 of the housing 120 and the edges 208, 238 of the convertible keypad 110 are substantially aligned with and substantially flush with the right lateral edge 124 of the housing 120. In this mode, the convertible keypad 110 has a width $W_1$.

In the telephone keypad mode, the phone 100 has a compact phone configuration that can be conveniently and comfortably stored in a tight storage location such as the front pocket of a user's pants, making the data phone available for anytime use. In the telephone keypad mode, the phone 100 is also in a configuration ready to send and receive cellular calls. The convertible keypad 110 may be retained in this position in the recess 260 by the one or more retaining mechanisms described above. Although the phone 100 is described as being in a telephone mode in FIG. 1, data features of the phone 100 may be accessible via the input keys 170 and/or the telephone keys 250.

With reference to FIGS. 2–4, the convertible keypad 110 is converted into the keyboard 270 for convenient data input purposes by urging the convertible keypad 110 laterally. This causes the spring-loaded contacts of the convertible keypad 110 to slide within the grooved tracks 266, 268 of the recess edges 262, 264 and the convertible keypad 110 to move outward, toward the user, and laterally. This movement (towards the user and laterally) causes the resulting keyboard 270 (FIG. 4) to be substantially centered with respect to the display 160 and a front face 274 of the keyboard 270 to be substantially flush with the front face 126 of the housing 120.

The convertible keypad 110 is then converted to the keyboard 270 by flipping the convertible keypad 110 open (FIG. 3). As indicated above, one or more springs may help bias or urge the convertible keypad 110 into one or more of the positions shown in FIGS. 1–4. For example, once the convertible keypad 110 is moved slightly from the home, telephone keypad position, one or more springs may automatically urge the convertible keypad 110 to the keyboard position shown in FIG. 4 without additional interaction from the user.

FIG. 4 illustrates the phone 100 in the data mode with the convertible keypad 110 in the fully deployed keyboard position. Data may be easily input into the phone 100 by selecting the keys 272, preferably with one's thumbs. Entering data in this manner is much easier to the average user than using a detachable stylus, which is easily lost or misplaced, and a special writing format. Once the keyboard 270 is fully deployed, a retaining mechanism (e.g., bump/dimple combination, spring-loaded contacts) may be used to retain the keyboard 270 in this position. The action of the one or more springs may also help retain the keyboard 270 in this position.

In the data mode, the keyboard 270 of the convertible keypad 110 has a width $W_2$ that is greater than the width $W_1$ of the telephone keyboard 242 of the convertible keypad 110 in the telephone mode. The keyboard 270 is preferably substantially centered with respect to the display 160, with the edges 208, 238 extending laterally beyond the lateral edges 122, 124 of the housing 120, and the front face 274 of the keyboard 270 substantially flush with the front face 126 of the housing 120. Although the phone 100 is described as being in a data mode in FIG. 2, telephone features of the phone 100 may be accessible via the keys 272 and/or the telephone keys 250.

To switch back to the telephone mode, the first member 180a is flipped over, onto the second member 210a and the convertible keypad 110 is moved laterally and inward, away from the user, to the telephone mode position, where the convertible keypad 110 may be snapped into place, in the recess 260 of the housing 120.

Alternative embodiments of the phone 100 may also allow the convertible keypad 110 to convert to a centered keyboard 270 by 1) moving the convertible keypad 110 laterally and outward, towards the user, and 2) flipping the convertible keypad 110 open into the keyboard 270. For example, the edges 262, 264 may have vertical and lateral grooved tracks that receive one or more spring-loaded contacts from the convertible keypad 110 to allow the convertible keypad 110 to move outward, towards the user, and laterally to center the convertible keypad 110. The convertible keypad of this embodiment may also have the hingeably connected members 180, 210 that may be flipped open into the keyboard 270. One or more springs may urge the convertible keypad 110 to the fully deployed keyboard position.

Figure 5:
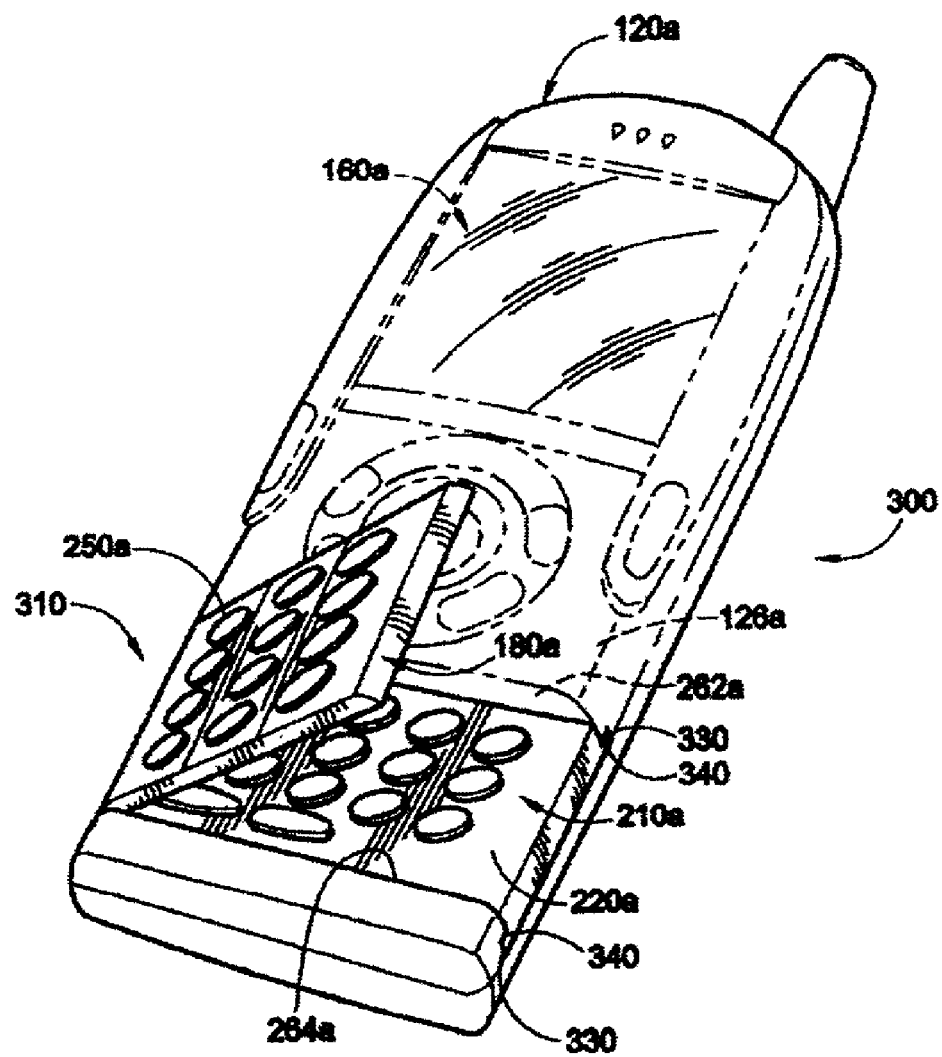
FIG. 5 is a perspective view of a data phone constructed in accordance with another embodiment of the invention with a convertible keypad shown in a home or telephone keypad position.
Figure 6:
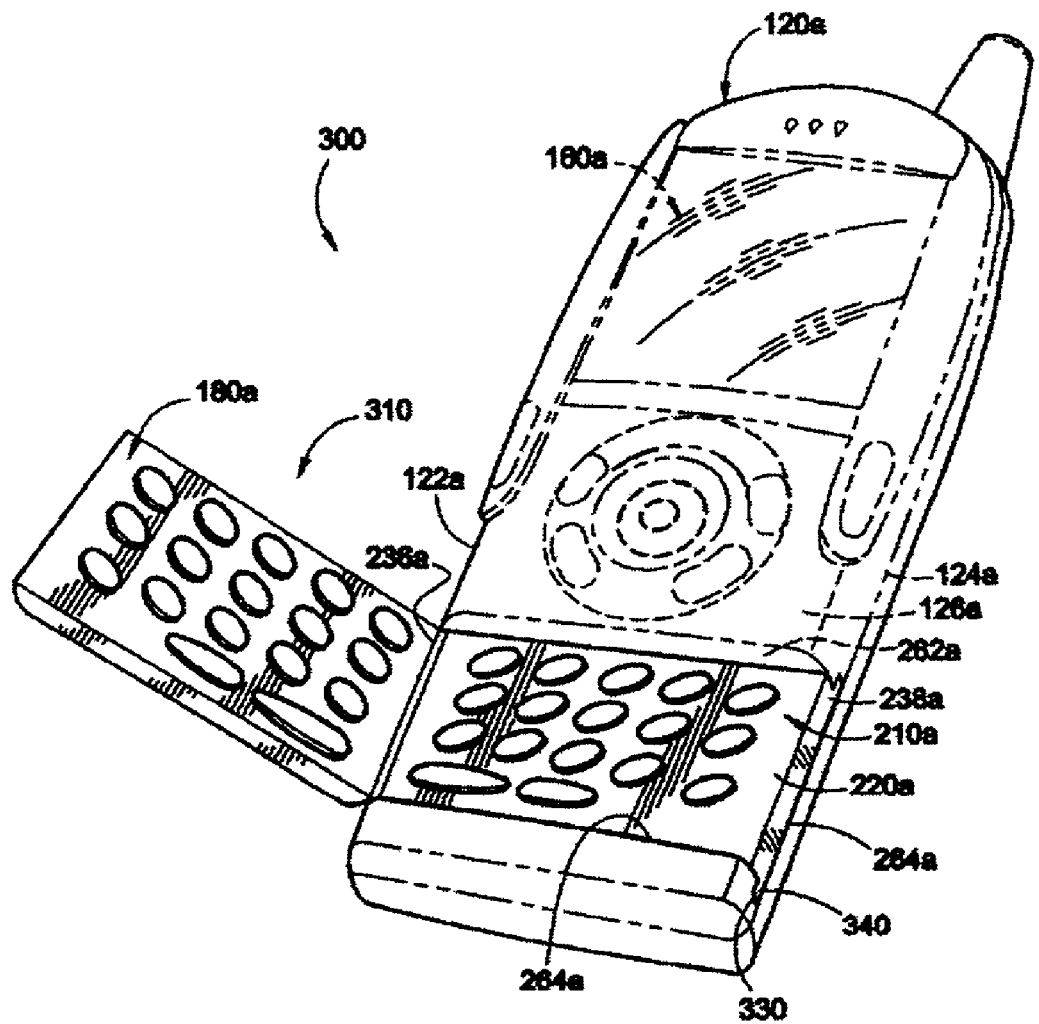
FIG. 6 is a perspective view of the data phone illustrated in FIG. 5 with the convertible keypad shown in a partially deployed keyboard position.
Figure 7:
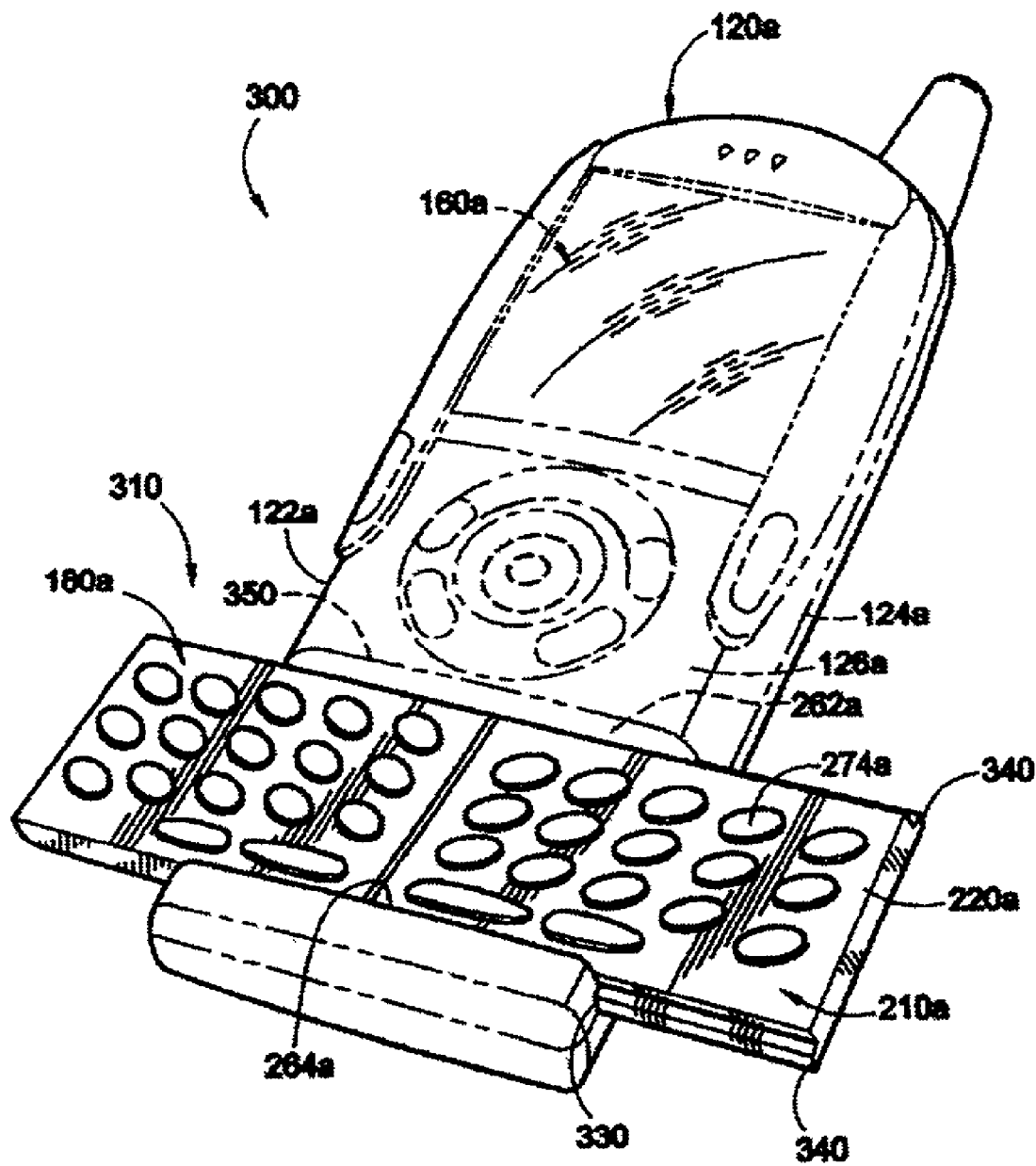
FIG. 7 is a perspective view of the data phone illustrated in FIG. 5 with the convertible keypad shown in a fully deployed keyboard position.

With reference to FIGS. 5–7, another embodiment of a data phone 300 with a convertible keypad 310 will now be described. Elements similar to those described above will be identified with like reference numbers, but with an "a" suffix. Instead of the convertible keypad 110 converting to the keyboard 270 by 1) moving the convertible keypad 110 laterally and outward, towards the user, and then 2) flipping the convertible keypad 110 open into the keyboard 270 as described above for the embodiment of the data phone 100 of FIGS. 1–4, the convertible keypad 310 of the embodiment of the phone 300 of FIGS. 5–7 is converted to a keyboard 320 by 1) flipping the convertible keypad 310 open into the keyboard 320, and 2) sliding the keyboard 320 laterally to a centered position with respect to the display 160a.

Similar to the convertible keyboard 110 described above with respect to FIGS. 1–4, the keyboard 310 may include a first member 180a hingeably connected to a second member 210a. To allow lateral sliding, the recess edges 262a, 264a of the housing 120a may have grooved tracks 330 that extend laterally across the width of the edges 262a, 264a. The grooved tracks 330 slidably receive flanges 340 of the convertible keypad 310 to allow the keyboard 320 to slide laterally for centering the keyboard 320 with respect to the display 160a to put the phone 300 in a data mode.

To switch back to the telephone mode, the keyboard 320 is slid in an opposite lateral direction so that the second member 210a is centered with respect to the display 160a and the edges 236a, 238a are substantially aligned with and flush with the respective lateral edges 122a, 124a of the housing 120a. The first member 180a is then flipped onto the second member 210a so that the telephone keys 250a are facing towards the user. One or more retaining mechanisms (e.g., bump/dimple combination, spring-loaded contacts) may be used to secure the convertible keypad 310 in the telephone keypad position and/or the keyboard position. Further, one or more springs may urge the convertible keypad 310 into the telephone keypad position, the centered keyboard position and/or any position in between these positions.

In the embodiment of the phone 300 shown in FIGS. 5–7, in the data mode (FIG. 7), the front face 274a of the keyboard 320 is not flush with the front face 126a of the housing 120a. This creates a ledge 350 at the intersection of the edges 262a, 264a and the front face 126a that may interfere with operation of the keys 272a with a user's thumbs.

To avoid this ledge 350, in another embodiment, the first member 180a of the convertible keypad 310 may normally protrude outwards, towards the user, and the front 220a of the second member 210a may be flush with the front face 126a of the housing 120a when the convertible keypad 310 is in the telephone mode. In this embodiment, when the convertible keypad 310 is flipped open into the keyboard, the front face 274a of the keyboard 320 will be flush with the front face 126a of the housing 120a, eliminating this ledge 360 during the data mode.

In another embodiment, the convertible keypad 110, 310 does not move in a lateral direction, i.e., the keyboard 320, when deployed, is off-centered with respect to the display 160a.

In a further embodiment, the convertible keypad 110, 310 may be removably attached to the housing 120, 120a of the phone 100, 300. In this embodiment, the convertible keypad 110, 310 may be removed from the phone 100, 300 and replaced with a different input mechanism and/or interchangeable input mechanism. Examples of other input mechanisms include, but are not limited to, a video game controller and a convertible keypad that converts between a telephone keypad and a video game controller.

Although the convertible keypad 110, 310 is described as converting between two positions or modes, in further embodiments, the convertible keypad 110, 310 may convert between greater numbers of modes (e.g., 3, 4, etc.). For example, a convertible keypad may convert between a telephone keypad, a keyboard, and a video game controller.

It will be readily apparent to those skilled in the art that still further changes and modifications in the actual concepts described herein can readily be made without departing from the spirit and scope of the invention as defined by the following claims.

What is claimed is:

1. A data phone, comprising:
   a data phone housing having a length along a length axis and a width along a width axis, the width axis substantially perpendicular to the length axis;
   a display carried by the data phone housing and positioned for viewing with respect to the length axis;
   a convertible keypad carried by the data phone housing and having a position below the display with respect to the length axis, the convertible keypad for converting between a telephone keypad and a keyboard while maintaining the position with respect to the length axis below the display, the telephone keypad having a first set of input keys available for selection by a user to dial out a phone number and the keyboard having a second set of input keys available for selection by the user to enter data into the data phone, the second set of input keys of the keyboard greater than the first set of input keys of the telephone keypad; and
   a centering mechanism for centering the keyboard with respect to the display along the width axis.

2. The data phone of claim 1, wherein the data phone housing includes housing lateral edges substantially parallel to the length axis, and wherein the convertible keypad includes keypad lateral edges that are substantially aligned with the housing lateral edges when the convertible keypad is the telephone keypad and wherein the keypad lateral edges extend beyond the housing lateral edges when the convertible keypad is the keyboard.

3. The data phone of claim 1, wherein the second set of input keys of the keyboard are separate from the first set of input keys of the telephone keypad.

4. The data phone of claim 1, wherein the convertible keypad includes a first member and a second member rotatably connected to convert between the telephone keypad and the keyboard.

5. The data phone of claim 4, wherein the first member and the second member are connected by a hinge, and wherein the first member opens from the second member about the hinge to convert between the telephone keypad and the keyboard.

6. The data phone of claim 5, wherein the opening of the first member and the second member extends the convertible keypad with respect to the width axis.

7. The data phone of claim 1, wherein the data phone housing comprises a housing front face and the keyboard comprises a keyboard front face that is flush with the housing front face when the convertible keypad is converted into the keyboard.

8. The data phone of claim 1, wherein the convertible keypad comprises at least one spring to urge the telephone keypad into the keyboard.

9. The data phone of claim 1,
wherein the telephone keypad comprises keypad electronics, the keyboard comprises keyboard electronics, the data phone comprises phone electronics housed by the data phone housing, and at least one connector for connecting the keypad electronics and keyboard electronics to the phone electronics, and
wherein the at least one connector comprises at least one of a spring-loaded contact, a flexible cable, and an infrared detector/transmitter combination.

10. The data phone of claim 1, wherein the convertible keypad is removably attached to the data phone.

11. A method of converting a phone from a telephone mode to a second mode, the phone having a convertible keypad, a display, and a housing for holding the convertible keypad and the display, the convertible keypad positioned in a recessed area below the display with respect to a length axis, the convertible keypad having a first configuration of a telephone keypad for use with the telephone mode and a second configuration of a second input device for use with the second mode, the method comprising the steps of:
expanding the convertible keypad below the display with respect to a width axis substantially perpendicular to the length axis and while maintaining the convertible keypad within the recessed area of the housing; and
centering the convertible keypad with respect to the display along the width axis.

12. The method of claim 11, wherein the second input device is selected from the group consisting of a keyboard and a video game controller.

13. The method of claim 11, wherein the phone comprises a housing with housing lateral edges, and the telephone keypad comprises keypad lateral edges that are substantially aligned with the housing lateral edges when the phone is in the telephone mode, and wherein the step of expanding further comprises the step of:
extending the second input device perpendicularly with respect to the length axis such that the extended second input device extends beyond the housing lateral edges when the phone is in the second mode.

14. The method of claim 11, wherein the telephone keypad comprises a first set of input members and the second input device comprises a second set of input members exclusive of the first set of input members of the telephone keypad.

15. The method of claim 11, wherein the telephone keypad comprises a first number of input members and the second input device comprises a second number of input members, wherein at least one member of the first number of input members of the telephone keypad is shared with the second number of input members.

16. The method of claim 11, wherein the convertible keypad is removably attached to the phone.

17. The method of claim 11, wherein the telephone keypad has a first width with respect to a width axis substantially perpendicular to the length axis, and the second input device has a second width with respect to the width axis that is greater than the first width of the telephone keypad.

* * * * *